Aug. 28, 1951  H. L. GORDON  2,565,496
MICROFILM READER AND PROJECTION APPARATUS
Filed Jan. 6, 1948  6 Sheets-Sheet 1

INVENTOR.
Herman L. Gordon

INVENTOR.
Herman L. Gordon

Aug. 28, 1951  H. L. GORDON  2,565,496
MICROFILM READER AND PROJECTION APPARATUS
Filed Jan. 6, 1948  6 Sheets-Sheet 4

INVENTOR.
Herman L. Gordon

Aug. 28, 1951     H. L. GORDON     2,565,496
MICROFILM READER AND PROJECTION APPARATUS
Filed Jan. 6, 1948     6 Sheets-Sheet 5
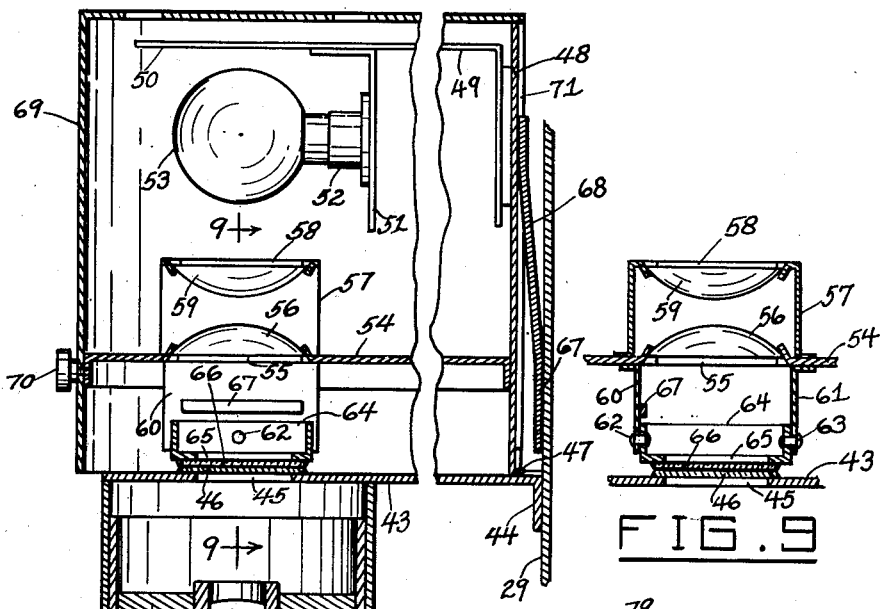
FIG. 8
FIG. 9
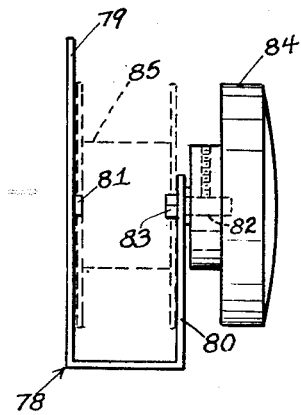
FIG. 10
INVENTOR.
Herman L. Gordon

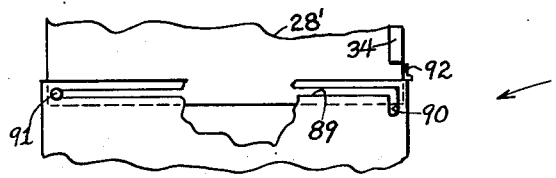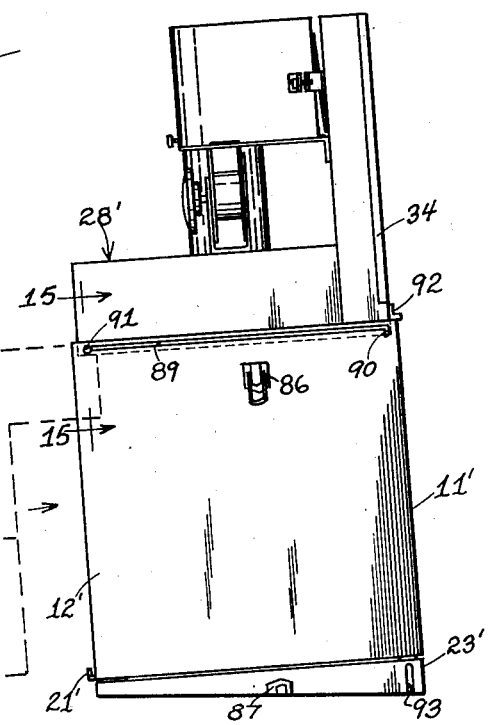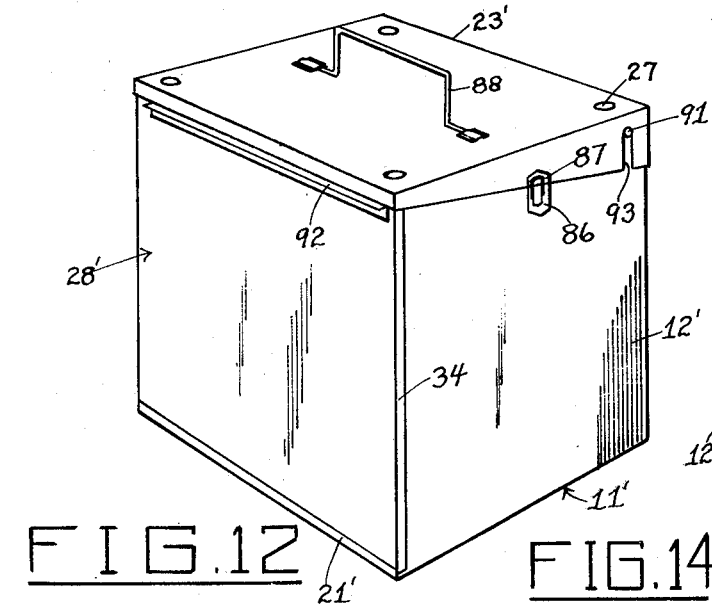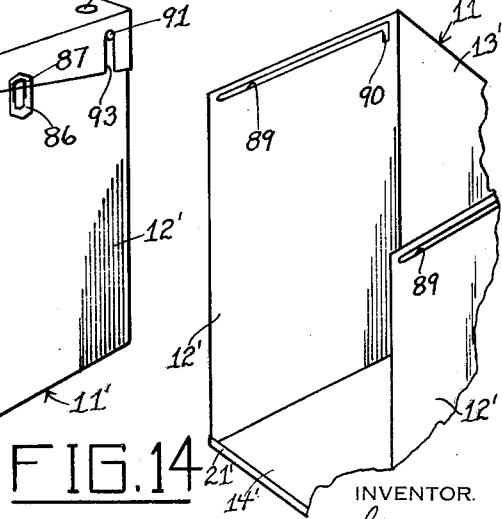

Patented Aug. 28, 1951

2,565,496

UNITED STATES PATENT OFFICE 2,565,496

MICROFILM READER AND PROJECTION APPARATUS

Herman L. Gordon, Silver Spring, Md.

Application January 6, 1948, Serial No. 729

10 Claims. (Cl. 88—24)

1

This invention relates to optical projection devices, and more particularly to a portable apparatus for projecting enlarged images from a film strip.

A main object of the invention is to provide a novel and improved projecting apparatus for microfilm which is very simple in construction, easy to operate, and which may be reduced to a relatively small bulk when not in use, thereby greatly facilitating storage of the apparatus or transportation thereof from place to place.

A further object of the invention is to provide an improved microfilm reader which may be readily reduced to a compact size for transportation or storage and which may be manufactured at a moderate cost, whereby it may be made more available for general use in reading material published on microfilm than the relatively bulky and expensive devices now produced for this purpose.

A still further object of the invention is to proprovide an improved microfilm reader of the type which includes its own projection screen but which is readily adaptable for wall projection on a conventional external screen.

A still further object of the invention is to provide an improved microfilm reader which is light in weight, rugged in consrtuction, and which, by transposition of parts, may be reduced in bulk to a relatively small package, totally enclosing the lens system and illumination means of the reader and affording a high degree of protection to these parts of the assembly.

A still further object of the invention is to provide an improved microfilm reader having a self-contained projection screen and wherein the film projection portion of the reader may be readily rotated from a normal position with respect to the screen to a position ninety degrees on either side of said normal position to enable microfilm material to be comfortably read on said screen regardless of the position in which it is printed on the film.

A still further object of the invention is to provide a microfilm reader having improved film feeding, clamping, and release means, and also embodying improved means for focussing the projection lens of the reader.

Further objects and advantages of the invention will become apparent from the following description and claims, and from the accompanying drawings, wherein:

Figure 1 is a side elevational view of a microfilm reader constructed in accordance with the present invention, said view showing the reader set up in operative position.

2

Figure 8 is an enlarged detail cross-sectional view taken on line 8—8 of Figure 3.

Figure 9 is an enlarged cross-sectional detail view taken on line 9—9 of Figure 8.

Figure 10 is an enlarged detail elevational view of a reel-holding clip employed in the microfilm reader of Figure 1.

Figure 11 is a side elevational view of a modified form of microfilm reader according to the present invention, set up for operation.

Figure 12 is a perspective view of the microfilm reader of Figure 11, in folded position for transportation or storage.

Figure 13 is an enlarged fragmentary detail view showing the sliding pivotal connection between the top assembly and the projection screen housing of the microfilm reader illustrated in Figures 11 and 12.

Figure 14 is a fragmentary perspective view showing a portion of the screen housing employed in the modification of Figures 11 and 12.

Figure 15 is an enlarged cross-sectional detail view taken on line 15—15 of Figure 11.

Figure 1:
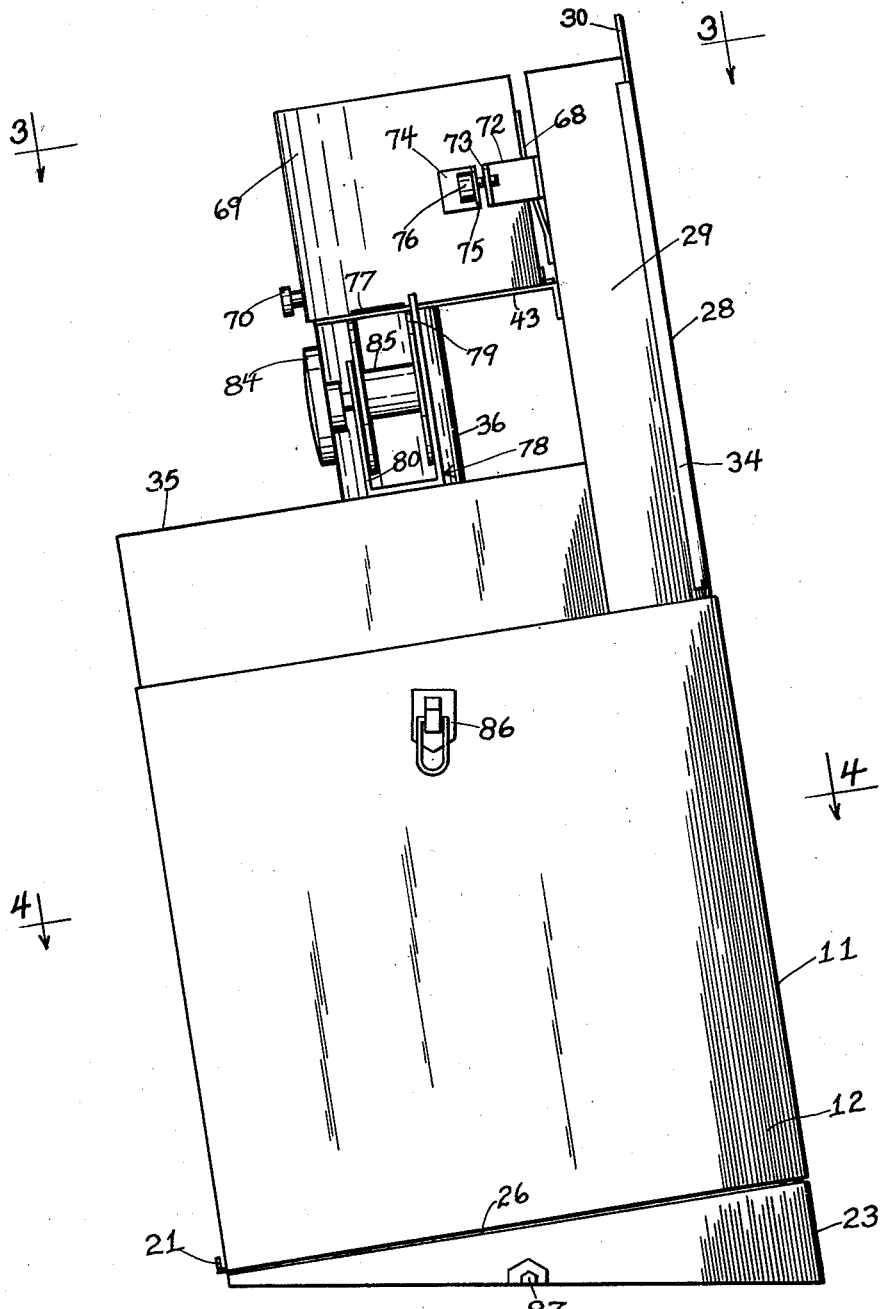
Figure 2:
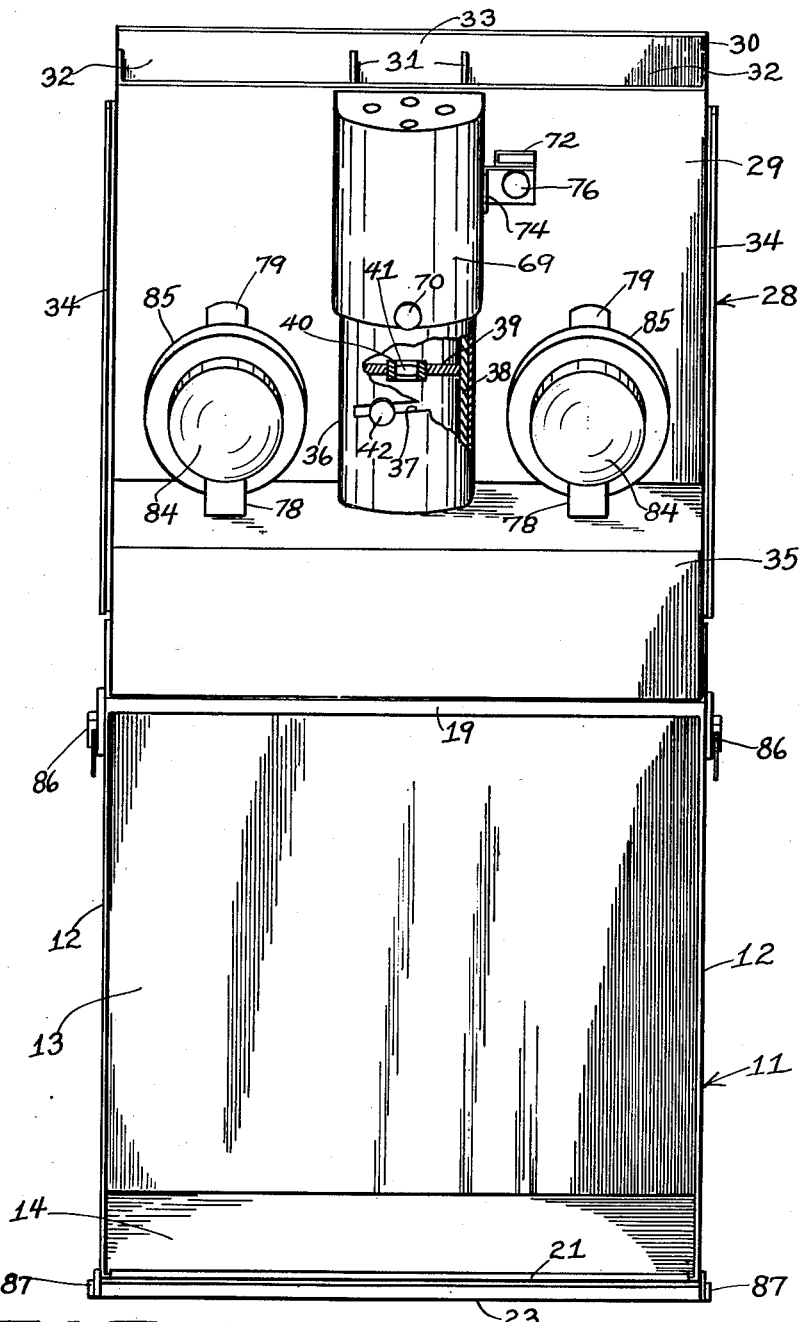
Figure 2 is a front elevational view, partly in cross-section, of the microfilm reader of Figure 1.
Figure 3:
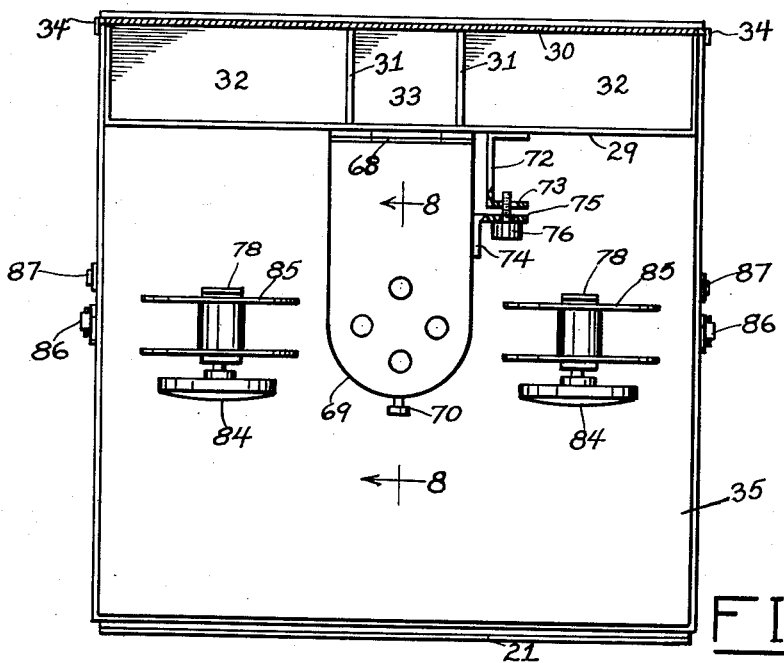
Figure 3 is a cross-sectional view taken on line 3—3 of Figure 1.
Figure 4:
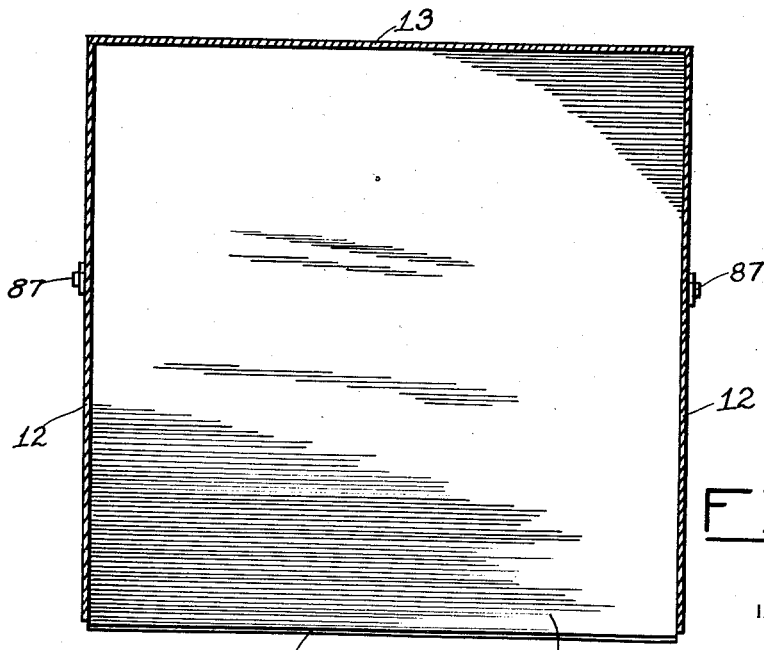
Figure 4 is a cross-sectional view taken on line 4—4 of Figure 1.

Referring to the drawings, and more particularly to Figures 1 to 4, 11 designates a housing made of sheet metal, or the like, which is preferably square in horizontal section and which has vertical side walls 12, 12, a vertical rear wall 13, and a bottom wall 14, which is suitably coated with light diffusing material or is otherwise covered, as by a white paper or fabric sheet, to provide a projection screen. The front of the housing is open so that the bottom wall of the housing may be viewed from the front thereof. The top wall of the housing comprises a plate 15, shown in Figure 7, formed with a large central aperture 16, the plate 15 being secured to the side walls 12, 12 and the rear wall 13 of the housing at a level slighty below the plane of the top edges of said side and rear walls. The front edge of plate 15 is formed with a vertical flange 19 whose top edge is flush with the top edges of the side and rear walls, thereby defining a square seat indicated at 20 in Figure 7.

Figure 5:
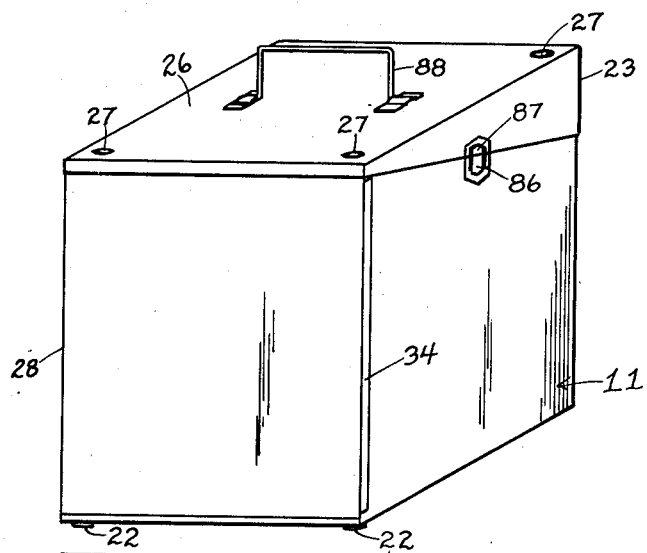
Figure 5 is a perspective view showing the reader of Figure 1 arranged for transportation.
Figure 6:
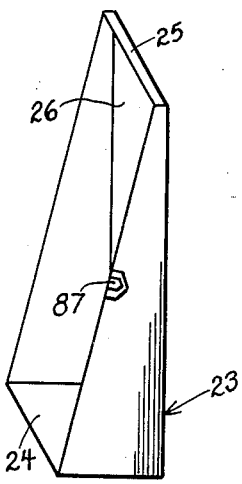
Figure 6 is a perspective view of the supporting base element of the reader of Figure 1, also employed as the top cover in Figure 5.
Figure 7:
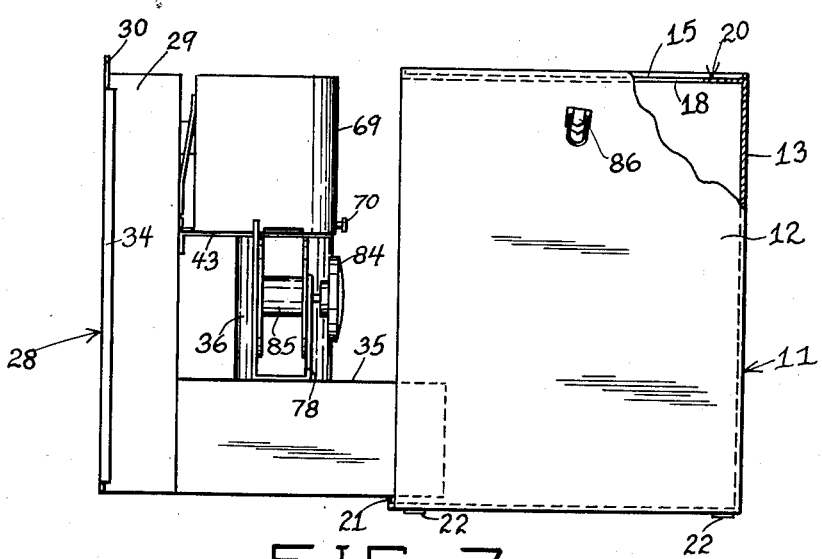
Figure 7 is an elevational view, partly in cross-section, illustrating the manner in which the upper member of the microfilm reader of Figure 1 is telescoped into the screen-enclosing housing of the reader when the apparatus is being collapsed for transportation or storage.

As shown in Figures 5 and 7, housing 11 forms the main outer casing of the instrument when it is collapsed for transportation or storage.

The bottom wall 14 of the housing is formed at its front edge with a vertical flange 21 which is forwardly offset with respect to the plane of the open front of the housing, for a purpose which will be subsequently described.

Secured to and depending from the bottom wall 14 adjacent the corners thereof are supporting feet 22. Designated at 23 is a square pan which forms a bottom support for housing 11 and which also serves as the top cover for the instrument when it is collapsed for transportation or storage. The rear wall of cover 23, designated at 24 is of substantially greater height than the front wall, shown at 25, thereof, whereby the top wall 26 of the cover slopes forwardly and downwardly, as shown in Figure 1. Said top wall 26 is formed with depressions or recesses 27 adjacent its corners, said depressions or recesses being adapted to receive the feet 22 of housing 11 to prevent said housing from sliding downwardly from the supported position thereof shown in Figure 1. The housing 11 is thus supported in a forwardly tilted position, whereby the bottom screen-carrying wall 14 is inclined upwardly and rearwardly, facilitating the observation of the screen through the open front portion of the housing.

Removably supported on the square seat 20 is a top assembly, indicated generally at 28, which carries the main optical elements of the instrument, as will be shortly described. Assembly 28 comprises a hollow rear columnar housing 29 extending substantially for the full lateral width of the assembly 28 and having a rear wall whose top end rises a short distance above the plane of the top edges of the columnar rear housing 29, as shown at 30. The top end of the housing 29 is open. Secured in housing 29 are vertical partitions 31, 31, which divide the housing into end compartments 32, 32 adapted to receive microfilm reels and the like, and a center compartment 33 adapted to receive miscellaneous objects such as spare bulbs and the like, for storage purposes.

The rear wall of housing 29 is formed with laterally projecting vertical end flanges 34, 34 which are bent forwardly and are offset laterally slightly beyond the planes of the side walls 12, 12 of the main supporting housing for a purpose to be presenty described.

Secured rigidly to the lower portion of the rear columnar housing 29 and coextensive in lateral width with said rear housing 29 is a sub-housing 35 which, together with the lower portion of rear housing 29, defines a square base for the assembly 28 adapted to fit into the square seat 20. The bottom of sub-housing 35 is open.

Secured to the top wall of sub-housing 35 and communicating with the interior thereof is a cylindrical casing 36 which is perpendicular to said top wall of the sub-housing and whose axis is substantially centered with respect to the square seat 20. Casing 36 is formed with an inclined slot 37, preferably at its front surface. Telescoped inside casing 36 and freely slidable therein is a cylindrical tube 38 in which is secured a plate 39. Centrally secured to the plate 39 is a lens barrel 40 which carries the projection lens 41. Threaded into tube 38 and passing through the slot 37 is a shouldered thumbscrew 42. When thumbscrew 42 is loosened, it may be employed to rotate tube 38 inside the sleeve 36, the slot 37 acting on the shank of the thumbscrew as a cam to move tube 38 axially inside sleeve 36. Projection lens 41 may thus be moved to a focusing position and locked in said position by tightening the thumbscrew 42.

Overlying the top end of sleeve 36 is a plate member 43 formed with a depending rear flange 44 which is rigidly secured to the front wall of the columnar housing 29, as by welding, or the like. Plate member 43 is formed with a rectangular aperture 45 which is axially aligned with the projection lens 41. Secured to said plate member 43 over the aperture 45 is a transparent glass plate 46.

Pivotally secured to the rear portion of plate member 43 by a transverse hinge 47 is an upstanding plate member 48. Secured to the upper portion of plate member 48 is an angle bracket 49 having a forwardly projecting arm 50. Secured to said arm 50 is a bracket 51 to which is secured the lamp socket 52. A projection lamp 53 is received in socket 52, said socket being so located that the lamp filament is substantially in axial alignment with the projection lens 41. Secured to the lower portion of plate member 48 is a flanged forwardly projecting plate member 54. Plate member 54 is formed with an aperture 55 over which is secured a first condenser lens 56, the aperture and lens being axially aligned with the lamp and lens system defined by lamp 53 and lens 41. Secured to said plate member 54 over the condenser lens 56 is an inverted U-shaped bracket 57 whose top arm is formed with an aperture 58. Secured to said top arm and underlying the aperture 58 is a second condenser lens 59, said second condenser lens and aperture 58 being also in axial alignment with the aforementioned lamp and projection lens system.

Secured to the bottom surface of plate member 54 and depending therefrom are parallel plate members 60 and 61 extending in planes normal to the plane of plate 48 and spaced symmetrically on each side of the axis of the lens system. Pivotally secured to said plate members respectively at 62 and 63 for rotation around a transverse axis is a flanged rectangular frame member 64 formed with a rectangular aperture 65 which is substantially in registry with the rectangular aperture 45 of the plate member 43. Secured to the bottom of frame member 64 under the aperture 65 is a transparent glass plate 66. An elongated bar member 67 is secured to plate member 60 a short distance above the adjacent flange edge of frame member 64 to limit pivotal rotation of said frame member.

Secured to the front wall of the columnar rear housing 29 at 67 is the lower end of an upwardly extending leaf spring 68, the top end of said spring bearing against the upper portion of the hinged plate 48 to bias said hinged plate forwardly, whereby glass plate 66 exerts pressure downwardly on glass plate 46. The pivotal connections at 62 and 63 allow the frame member 64 to automatically assume a position wherein plane surface contact of glass plate 66 with a film resting on glass plate 46 may be obtained. The spring 68 provides sufficient force to flatten out said film, whereby any possible aberration due to curvature of the film surface is eliminated.

The pressure on the film, however, is not sufficient to prevent the film from being drawn between the glass plates during the operation of the reader.

Designated at 69 is a housing whose forward wall portion is detachably secured to the flange of plate member 54 by means of a thumbscrew 70 passing through an aperture in said forward wall portion and threaded into said flange. The housing 69 is provided at its rear portion with inturned flanges 71 which engage the marginal portions of upstanding plate member 48. When the thumbscrew 70 is extracted, the housing 69 may be removed by moving it upwardly with respect to plate member 48 until the inturned flanges 71 are clear of said plate member. This permits replacement of the projection bulb when required.

Secured to the front wall of columnar housing 29 adjacent the housing 69 is a bracket 72 formed with a transversely extending forward arm 73. Secured to housing 69 is an angle bracket 74 having a laterally projecting arm 75 which is substantially parallel to but forwardly spaced from arm 73. A thumbscrew 76 passes through an aperture in arm 75 and is threaded into arm 73. By tightening said thumbscrew the lamp housing 69 and the supporting plate members 54 and 48 may be rotated rearwardly to raise glass plate 66 a sufficient distance above glass plate 46 to permit film to be freely inserted therebetween, as when a new film strip is to be read, or to be freely removed from between said glass plates whenever required.

The side edges of the housing 69 are formed with shallow notches, such as shown at 77, slightly greater than film width, to provide clearance for film passing transversely between the glass plates 46 and 66 during normal operation of the reader. Said notches act as guides to prevent forward or rearward movement of the film strip as it moves between the glass plates.

Secured to the top wall of sub-housing 35 at each side of the sleeve member 36 is a resilient U-shaped reel bracket 78, the brackets 78 being in transverse alignment with the notches 77 and with the film clamping plates 46 and 66. The rear arm 79 of each bracket is substantially greater in height than the front arm 80 thereof. Secured to the intermediate portion of the rear arm is a bearing stud 81, and rotatably received in the front arm 80 is a stud 82 having an enlarged squared inner head portion 83. Secured to the shank of stud 82 is a knob 84. A conventional film reel, shown in dotted view at 85 in Figure 10, is receivable within each bracket 78, the rear bore portion of the reel receiving the bearing stud 81 and being rotatable thereon and the front squared bore portion of the reel interlocking with the squared stud head 83. The reel may therefore be rotated by rotating knob 84. To remove the reel the rear arm 79 of the bracket is sprung rearwardly, moving the bearing stud 81 out of the rear bore portion of the reel and allowing the reel to be readily disengaged from the squared stud head 83. A new reel may be inserted in the bracket by a reverse procedure.

When the reader is to be employed for wall projection, the top assembly 28, carrying the main optical elements and the film supporting elements of the instrument is supported on any suitable base, such as a table or the like, with the rear columnar housing 29 positioned horizontally or at a slight incline and resting on the base support employed. The pan 23 may be placed beneath the columnar housing to provide the desired tilted position of the instrument, so that the projection axis thereof will be parallel to the inclined top wall 26 of the pan, the columnar housing 29 being supported on said top wall 26.

Since the top assembly 28 is square in plan at its lower portion and is normally supported in the square seat 20 in a manner allowing said top assembly to be readily lifted out of said seat, it is merely necessary to raise said top assembly out of seat 20, rotate said top assembly ninety degrees, and replace the top assembly in seat 20. This enables microfilm material printed transversely instead of vertically on the strip to be read from the normal frontal position of observation.

When the reader is to be collapsed for transportation or storage, the top assembly 28 is lifted out of its seat 20 and telescoped into the bottom housing 11 through the screen viewing opening thereof in the manner illustrated in Figure 7. When the assembly 28 is fully housed in bottom housing 11, the bottom edge of the back wall of columnar housing 29 is received inside the offset flange 21 and the front vertical edges of the side walls 12, 12 are received inside the offset vertical flanges 34, 34. In this position of assembly 28, the top edge 30 of the rear wall of said assembly is flush with the top edges of the walls of the housing 11. The pan 23 is then telescoped over the top of these parts. Secured to the upper intermediate portions of the side walls 12, 12 of the main housing 11 are conventional latches 86, 86, preferably of the draw bolt type, which are adapted to engage over lug elements 87, 87 carried by the side flanges of pan 23. When the pan is locked to the bottom housing 11 by the interengagement of latches 86, 86 with the lug elements 87, 87, all of the parts 11, 28 and 23 are rigidly secured in interlocking relation, as illustrated in Figure 5.

Pan 23 is provided with a handle 88 pivotally secured to its top wall, by means of which the collapsed unit may be readily carried from place to place.

Referring now to Figures 11 to 15, a modified form of microfilm reader according to the present invention is illustrated, wherein 11' designates a generally rectangular housing having a bottom wall 14' which is suitably coated with a flat white material or is lined with other suitable screen material such as white blotting paper or the like. Housing 11' has side walls 12', 12' and a rear wall 13' but is open at its front. The front edge of bottom wall 14 is formed with an upstanding flange 21' which is slightly forwardly offset with respect to the front plane of the housing. The top portions of side walls 12', 12' are formed with horizontal slots 89, 89 which extend substantially for the full width of said side walls and terminate in downwardly directed vertical portions 90, inwardly adjacent the rear wall 13'. Designated at 28' is a top assembly which carries the same optical elements and is substantially the same in construction as the top assembly 28 of the previously described embodiment of the invention. Top assembly 28' fits snugly in the top portion of housing 11' and has secured to its lower forward corners laterally projecting headed pins 91 which are respectively slidably received in the horizontal slots 89, 89 formed in the housing side walls 12', 12' and support the front end of top assembly 28'. Secured to the lower marginal portion of the rear wall of top assembly 28' is a horizontal angle bar 92 which bears on the top edge of the rear wall 13' of housing 11' and supports the rear end of said top assembly.

In the operative position of the microfilm reader, screen housing 11' is supported in a forwardly inclined position on the top wall of a cover pan 23', substantially the same in construction as the cover pan 23 of the previously described embodiment of the invention. Figure 11 shows the relative positions of the parts when the reader is set up for operation.

When the microfilm reader is to be collapsed for transportation or storage, top assembly 28' is rotated counter-clockwise on its pivot pins 91, as viewed in Figure 11, and is telescoped inwardly into housing 11' from the dotted position shown in Figure 11 until the rear wall of top assembly 28' clears the flange 21'. At this time the pivot pins 91 reach the vertical slot portions 90 and allow the top assembly to descend inwardly of the flange 21'. The cover 23' is then placed over the top of housing 11' and is latched thereto as in the previously described embodiment of the invention. The side flanges of pan 23' are formed with vertical slots 93, providing clearance for the heads of pins 91 when said pan is fitted on the top of housing 11' as above described. The side flanges 34, 34 of top assembly 28' interlock with the front edges of side walls 12', 12' in the same manner as in the previously described embodiment of the invention.

While certain specific embodiments of a microfilm reader have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A microfilm reader comprising a screen housing, a film projection unit adapted to be supported on the top of said screen housing, said screen housing being formed with a screen viewing opening through which said film projection unit may at times be telescoped into said screen housing, a cover member adapted to be placed over the screen housing when the projection unit is telescoped therein, said film projection unit having a wall portion whose top end abuts the side surface of the top end of the housing when the film projection unit is received within the housing, and means on said cover member engageable with the top end of the wall portion of said film projection unit to prevent withdrawal of said projection unit from its telescoped position in the screen housing.

2. A microfilm reader comprising a rectangular housing square in plan provided at its bottom wall with a projection screen, one of the side walls of said housing being formed with a large opening through which said screen may be observed, said housing having upstanding projections at the marginal portions of its top wall defining a square seat, said top wall being formed at its intermediate portion with an aperture, a film projection unit having a square base snugly receivable in said seat with its projection axis extending through said aperture and intercepted by said screen, said film projection unit being at times receivable through said opening into said housing, said film projection unit having a wall portion whose top end abuts the side surface of the top end of the housing when the film projection unit is received within the housing, and a flanged cover fitting over the top ends of the housing and said wall portion and acting to retain said film projection unit in telescoped position within said housing.

3. The structure of claim 2, and wherein the side flanges of said cover have parallel bottom edges which are inclined with respect to the top of the cover, whereby said cover may be employed as an inclined support for the screen housing.

4. The structure of claim 2, and wherein said projection unit is provided with flanges interlocking with the front edges of the side walls of the screen housing when the projection unit is in telescoped position within said screen housing.

5. A microfilm reader comprising a main housing having a viewing screen at its bottom wall, a top member provided with a film projection unit, means on said main housing for supporting the top member thereon with said projection unit directed toward said viewing screen, a viewing opening being formed in one of the side walls of the main housing and the top member being at times receivable through said viewing opening into housed position in said main housing, and upstanding flange means carried by said main housing at the lower margin of said viewing opening and engaging said top member to lock said top member against outward movement with respect to said main housing when said top member is in housed position.

6. A microfilm reader comprising a main housing having a viewing screen at its bottom wall, a top member provided with a film projection unit, means on said main housing for supporting the top member thereon with said projection unit directed toward said viewing screen, a viewing opening being formed in one of the side walls of the main housing and top member being at times receivable through said viewing opening into housed position in said main housing, upstanding flange means carried by said main housing at the lower margin of said viewing opening and engaging said top member to lock said top member against outward movement with respect to said main housing when said top member is in housed position, said top member having a wall portion whose top end abuts the side surface of the top end of the main housing when said top member is received within the main housing, and a cover member fitting the top of said main housing and over the top end of said wall portion and acting to restrain said top member against upward movement in said main housing.

7. A microfilm reader comprising a main housing having a viewing screen at its bottom wall, a top member slidably and pivotally secured to said main housing and carrying a film projection unit, means on said main housing for supporting the top member thereon with said projection unit directed toward said viewing screen, the housing being formed with a viewing opening at one of its walls and the top member being at times receivable through the viewing opening for movement into housed position within said main housing, and a flanged cover fitting over said main housing and engageable with said top member when it is in housed position to restrain the top member against outward movement from said housed position.

8. A microfilm reader comprising a screen housing substantially open at its front wall, a film projection unit, means on said housing for supporting the projection unit thereon with the projection unit directed toward the bottom wall of said housing, the film projection unit being at times receivable through said substantially open front wall and being rearwardly movable into telescoped position in said housing, said projection unit having a wall portion whose top end lies laterally adjacent the side of the top end of the housing when said projection unit is received within the housing, and a flanged cover fitting over the top of said housing and over the top end of said wall portion, thereby engaging the projection unit when it is in telescoped position in said housing to restrain upward and outward movement of said projection unit with respect to said housing.

9. A microfilm reader comprising a screen housing substantially open at its front wall, a film projection unit, means on said housing for supporting said projection unit thereon with the projection unit directed toward the bottom wall of the housing, the film projection unit being at times receivable through said substantially open front wall and being rearwardly movable into telescoped position in said housing, side flanges carried by said film projection unit receiving the forward vertical edges of the housing when said unit is in telescoped position, an upwardly projecting front flange carried by the bottom wall of the housing engageable with the projection unit to restrain said unit from outward movement from its telescoped position, said projection unit having a wall portion whose top end lies laterally adjacent the side plane of the top end of the housing when said projection unit is received within the housing, and a flanged cover fitting over the top of the housing and over the top end of said wall portion, thereby engaging said projection unit when it is in housed position to restrain it from upward and outward movement with respect to the housing.

10. A microfilm reader comprising a main housing member having a viewing screen at its bottom wall, a top member, one of said members being formed at its sides with opposed horizontal slots and the other member being provided with pin elements slidably and pivotally received in said slots, a film projection unit mounted on said top member, and means on said main housing member formed and arranged to support said top member thereon with said projection unit directed toward said viewing screen, the housing member being formed with a viewing opening at its front wall and the top member being at times receivable through said viewing opening for horizontal movement into housed position within said main housing member.

HERMAN L. GORDON.

REFERENCES CITED

The following references are of record in the file of this patent:

UNITED STATES PATENTS

| Number | Name | Date |
|---|---|---|
| 1,172,945 | Cook | Feb. 22, 1916 |
| 1,653,743 | Stegmann | Dec. 27, 1927 |
| 2,008,982 | Hopkins | July 23, 1935 |
| 2,221,160 | Worthington et al. | Nov. 12, 1940 |
| 2,268,450 | Haggett | Dec. 30, 1941 |
| 2,279,463 | Hopkins | Apr. 14, 1942 |
| 2,369,248 | Pratt | Feb. 13, 1945 |
| 2,377,476 | Berglund | June 5, 1945 |

FOREIGN PATENTS

| Number | Country | Date |
|---|---|---|
| 862,028 | France | Nov. 22, 1940 |